United States Patent
Bang

(10) Patent No.: US 9,007,047 B2
(45) Date of Patent: Apr. 14, 2015

(54) VEHICLE BUCK POWER CONVERSION CONTROL APPARATUS AND METHOD

(71) Applicant: Hyundai Mobis Co., Ltd., Seoul (KR)

(72) Inventor: Hyo Jin Bang, Seoul (KR)

(73) Assignee: Hyundai Mobis Co., Ltd., Seoul (KR)

(*) Notice: Subject to any disclaimer, the term of this patent is extended or adjusted under 35 U.S.C. 154(b) by 144 days.

(21) Appl. No.: 13/771,211

(22) Filed: Feb. 20, 2013

(65) Prior Publication Data

US 2014/0125120 A1    May 8, 2014

(30) Foreign Application Priority Data

Nov. 5, 2012 (KR) .................. 10-2012-0124340

(51) Int. Cl.
*G05F 1/00* (2006.01)
*B60L 11/18* (2006.01)
*H02M 3/157* (2006.01)

(52) U.S. Cl.
CPC ............... *B60L 11/18* (2013.01); *H02M 3/157* (2013.01)

(58) Field of Classification Search
CPC ...... H02M 3/157; H02M 3/156; H02M 3/158
USPC ................................... 323/282–288
See application file for complete search history.

(56) References Cited

U.S. PATENT DOCUMENTS

| | | | |
|---|---|---|---|
| 6,580,258 B2* | 6/2003 | Wilcox et al. ................. | 323/282 |
| 7,800,351 B2* | 9/2010 | Gan .............................. | 323/283 |
| 7,919,952 B1* | 4/2011 | Fahrenbruch ................. | 323/282 |
| 2007/0216372 A1* | 9/2007 | Weng et al. ................... | 323/222 |
| 2008/0231247 A1* | 9/2008 | Uehara ......................... | 323/284 |
| 2012/0194141 A1 | 8/2012 | Shi et al. | |

FOREIGN PATENT DOCUMENTS

| | | |
|---|---|---|
| JP | 2007-312586 A | 11/2007 |
| JP | 2012-19674 | 1/2012 |
| KR | 10-1060781 | 8/2011 |

* cited by examiner

*Primary Examiner* — Jue Zhang
(74) *Attorney, Agent, or Firm* — NSIP Law

(57) ABSTRACT

The present invention relates to a vehicle buck power conversion control apparatus and method, which improves control performance of power conversion even when load current is changed by further considering input current varied according to the load current in controlling a pulse width modulation signal by using an existing fixed chopping wave.

10 Claims, 3 Drawing Sheets

VEHICLE BUCK POWER CONVERSION CONTROL APPARATUS AND METHOD

CROSS-REFERENCE TO RELATED APPLICATIONS

This application claims priority to and the benefit of Korean Patent Application No. 10-2012-0124340 filed in the Korean Intellectual Property Office on Nov. 5, 2012, the entire contents of which are incorporated herein by reference.

TECHNICAL FIELD

The present invention relates to a vehicle buck power conversion control apparatus and method. More particularly, the present invention relates to a vehicle buck power conversion control apparatus and method, which improves control performance of power conversion even when load current is changed by further considering input current varied according to the load current in controlling a pulse width modulation signal by using an existing fixed chopping wave.

BACKGROUND ART

In order to decrease capacity of a low voltage battery for a vehicle is used in an existing hybrid vehicle or electric vehicle, a buck converter is used. The buck converter converts a high voltage of a high voltage battery for a hybrid vehicle or an electric vehicle into a low voltage. The converted low voltage is charged in a low voltage battery of a vehicle, and is used as a power source of an electric field load.

An output controller monitors an output voltage of the buck converter, compares the monitored output voltage with a reference voltage, and then generates output in proportion to a size of a vehicle.

In the related art, the converter is controlled by controlling an On-time of a pulse width modulation (PWM) signal only with the output generated by the output controller and a chopping wave of a fixed frequency. In this case, there exists a problem in that a response speed against a rapid change of load current is slow.

SUMMARY OF THE INVENTION

The present invention has been made in an effort to provide a vehicle buck power conversion control apparatus and method, which improves control performance of power conversion even when load current is changed by further considering input current varied according to the load current in controlling a pulse width modulation signal by using an existing fixed chopping wave.

An exemplary embodiment of the present invention provides an apparatus for controlling bulk conversion of a vehicle when load current is increased or decreased, the apparatus including: a power converter configured to convert a high voltage of a high voltage battery to a low voltage; a voltage comparator configured to compare a low voltage output value of the power converter to a preset reference voltage; an output controller configured to generate output based on a comparison result of the voltage comparator; and a comparison controller configured to control an operation of a pulse width modulation (PWM) signal by comparing a chopping wave considering input current varied according to the increase or the decrease in the load current with output generated in the output controller.

When the low voltage output value is equal to or larger than the preset reference value according to the comparison result of the voltage comparator, the output controller may increase the generated output, and when the low voltage output value is smaller than the preset reference value according to the comparison result of the voltage comparator, the output controller may decrease the generated output.

When the output controller increases the output, the comparison controller may compare a value obtained by multiplying a value obtained by dividing the input current by N that is larger than 1 with the chopping wave with a size of the output, when the output is larger than the obtained value as a result of the comparison, the comparison controller may decrease an On time of the pulse width modulation signal, and when the output is smaller than the obtained value as the result of the comparison, the comparison controller may increase the On time of the pulse width modulation signal.

When the output controller decreases the output, the comparison controller may compare a value obtained by multiplying a value obtained by dividing the input current by N that is larger than 1 with the chopping wave with a size of the output, when the output is larger than the obtained value as a result of the comparison, the comparison controller may decrease an On time of the pulse width modulation signal, and when the output is smaller than the obtained value as the result of the comparison, the comparison controller may increase the On time of the pulse width modulation signal.

When the load current is increased, the input current may be increased, and when the load current is decreased, the input current may also be decreased.

Another exemplary embodiment of the present invention provides a method of controlling bulk conversion of a vehicle when load current is increased or decreased, the method including: a power conversion operation of converting a high voltage of a high voltage battery to a low voltage; a voltage comparison operation for comparing a low voltage output value of the power conversion operation to a preset reference voltage; an output control operation for generating output based on a comparison result of the voltage comparison operation; and a comparison control operation for controlling an operation of a pulse width modulation (PWM) signal by comparing a chopping wave considering input current varied according to the increase or the decrease in the load current with output generated in the output control operation.

The output control operation may include: increasing the generated output when the low voltage output value is equal to or larger than the preset reference value according to the comparison result of the voltage comparison operation, and decreasing the generated output when the low voltage output value is smaller than the preset reference value according to the comparison result of the voltage comparison operation.

When the output is increased in the output control operation, the comparison control operation may include: comparing a value obtained by multiplying a value obtained by dividing the input current by N that is larger than 1 with the chopping wave with a size of the output; decreasing an On time of the pulse width modulation signal when the output is larger than the obtained value as a result of the comparison; and increasing the On time of the pulse width modulation signal when the output is smaller than the obtained value as the result of the comparison.

When the output is decreased in the output control operation, the comparison control operation may include: comparing a value obtained by multiplying a value obtained by dividing the input current by N that is larger than 1 with the chopping wave with a size of the output; decreasing an On time of the pulse width modulation signal when the output is larger than the obtained value as a result of the comparison;

and increasing the On time of the pulse width modulation signal when the output is smaller than the obtained value as the result of the comparison.

When the load current is increased, the input current may be increased, and when the load current is decreased, the input current may also be decreased.

The present invention may improve control performance of power conversion when load is changed, especially, load is rapidly changed.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
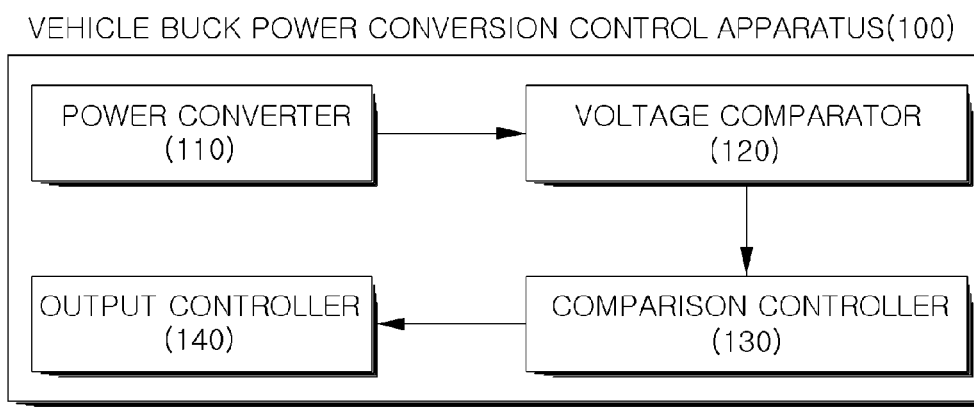
FIG. 1 is a block diagram related to a vehicle buck power conversion control apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the drawings. The substantially same constituent elements are indicated by the same reference numbers in the following description and the accompanying drawings, so that a repeated description will be omitted. In the description of the present invention, a detailed explanation of known related functions and constitutions may be omitted when it is determined to unnecessarily make the subject matter of the present invention obscure.

It should be understood that when one constituent element referred to as being "coupled to" or "connected to" another constituent element, one constituent element can be directly coupled to or connected to the other constituent element, but intervening elements may also be present. In contrast, when one constituent element is "directly coupled to" or "directly connected to" another constituent element, it should be understood that there are no intervening element present.

In the present specification, singular expressions include plurals unless they have definitely opposite meanings. The meaning of "comprises" and/or "comprising" used in this specification does not exclude the existence or addition of aforementioned constituent elements, steps, operations, and/or device, and one or more other constituent elements, steps, operations, and/or devices.

FIG. 1 is a block diagram related to a vehicle buck power conversion control apparatus according to an exemplary embodiment of the present invention.

Referring to FIG. 1, a vehicle buck power conversion control apparatus 100 according to an exemplary embodiment of the present invention includes a power converter 110, a voltage comparator 120, an output controller 130, and a comparison controller 140.

The vehicle buck power conversion control apparatus 100 according to an exemplary embodiment of the present invention is characterized in improving performance of the conversion control apparatus by rapidly compensating for an operation time of a pulse width modulation wave by varying output of the output controller 130 when a load is changed by using input current of the power converter 110, as well as a chopping wave of a fixed frequency.

The power converter 110 converts a high voltage of a high voltage battery to a low voltage.

When an electric field load is increased in a normal operation state, load current of the power converter 110 is sharply increased. On the contrary, when an electric field load is decreased in a normal operation state, load current of the power converter 110 is sharply decreased.

The voltage comparator 120 compares low voltage output of a power conversion apparatus and a preset reference voltage Vth.

When a high voltage is input from the high voltage battery that is a power source of an electric vehicle or a hybrid vehicle in the power converter 110, the input high voltage is converted in the power converter 110 to be output to the low voltage battery as a low voltage. In this case, the output low voltage is low voltage output.

The preset reference voltage Vth may be approximately 14.3 V based on a low voltage CD/CD converter. However, the preset reference voltage Vth may be changed according to a specification of a vehicle, and a different type of converter, not the LDC, may have a different reference voltage.

The output controller 130 generates output out1 based on a comparison result of the voltage comparator 120.

Specifically, the output controller 130 generates the output Out1 in proportion to a size of a difference between a lower voltage output value of the power converter 110 and the preset reference voltage Vth.

The output controller 130 may increase the generated output Out1 when the low voltage output value is equal to or larger than the preset reference voltage Vth as a comparison result of the voltage comparator 120.

The output controller 130 may decrease the generated output Out1 when the low voltage output value is smaller than the preset reference voltage Vth as a comparison result of the voltage comparator 120.

The output Out1 generated and increased or decreased in the output controller 130 is compared with a chopping wave considering input current by the comparison controller 140.

Specifically, the comparison controller 140 compares the output Out1 generated in the output controller 130 and increased or decreased according to the comparison result of the voltage comparator 120 with (the chopping wave×the input current/N).

The chopping wave is a chopping wave generated with a predetermined frequency for periodical switching of the power converter 110. The chopping wave may be generated in a chopping wave generator (not illustrated).

The input current is input current of the power converter 110 varied according to a load of the power converter 110, such as the low voltage battery or the electric field load. That is, when the load is sharply increased, the input current is also increased, and when the load is sharply decreased, the input current is also decreased. N has a value larger than 1, and may be determined according to a capacity of the power converter 110 and a control time constant.

The comparison controller 140 may control an operation time of the pulse width modulation (PWM) signal based on a result of a comparison of the output Out1 with (the chopping wave×the input current/N).

Specifically, when the output Out1 is larger than (the chopping wave×the input current/N) as the result of the comparison of the output Out1 with (the chopping wave×the input current/N), the comparison controller 140 may decrease the operation time of the PWM signal by turning off the PWM signal. However, when the output Out1 is smaller than (the chopping wave×the input current/N) as the result of the comparison of the output Out1 with (the chopping wave×the input current/N), the comparison controller 140 may increase the operation time of the PWM signal by turning on the PWM signal.

The vehicle buck power conversion control apparatus 100 according to the exemplary embodiment of the present invention will be described through a comparison with a vehicle buck power conversion control apparatus in the related art with reference to Tables 1 and 2.

TABLE 1

| Operation mode | Input current | Output (Out1) | Comparison target | PWM ON condition | PWM ON time |
|---|---|---|---|---|---|
| When a load is increased | Increase | Decrease | Chopping wave (fixed) | Out1 < Chopping wave | Increase |
| When a load is decreased | Decrease | Increase | Chopping wave (fixed) | Out1 < Chopping wave | Decrease |

TABLE 2

| Operation mode | Input current | Output (Out1) | Comparison target | PWM ON condition | PWM ON time |
|---|---|---|---|---|---|
| When a load is increased | Increase | Decrease | Chopping wave × input current/N | Out1 < (Chopping wave × input current/N) | Increase |
| When a load is decreased | Decrease | Increase | Chopping wave × input current/N | Out1 < (Chopping wave × input current/N) | Increase |

Referring to Tables 1 and 2, the vehicle buck power conversion control apparatus according to the exemplary embodiment of the present invention may be separately applied to a case where the load is increased and a case where the load is decreased. A process of separately applying the vehicle buck power conversion control apparatus according to the exemplary embodiment of the present invention to the case where the load is increased and the case where the load is decreased will be described later together with FIGS. 2 and 3.

In comparison between the vehicle buck power conversion control apparatus in the related art and the vehicle buck power conversion control apparatus according to the exemplary embodiment of the present invention, it can be seen that the vehicle buck power conversion control apparatus according to the exemplary embodiment of the present invention may use the vehicle buck power conversion control apparatus in the related art, but a comparison target compared by the comparison controller 140 in order to determine the PWM On condition is different.

That is, the vehicle buck power conversion control apparatus in the related art uses the fixed chopping wave with the predetermined frequency as the PWM On condition and a determination condition for controlling the PWM On time. Accordingly, it can be seen that in the vehicle buck power conversion control apparatus in the related, the PWM On time is increased when the load is increased, especially, the load is sharply increased, and the PWM On time is decreased when the load is decreased, especially, the load is sharply decreased. However, it can be seen that the vehicle buck power conversion control apparatus according to the exemplary embodiment of the present invention reflects the variable input current to the fixed chopping wave, so that the PWM On time is increased based on the same output value of the output controller 130, compared to the vehicle buck power conversion control apparatus in the related. That is, the input current is sharply decreased due to a sharp decrease of the load current according to the decrease of the electric field load, and the sharply decreased input current is used for the PWM operation (on/off) condition and the determination of the PWM operation time, so that the PWM On time may be increased compared to the vehicle buck power conversion control apparatus in the related.

Accordingly, the vehicle buck power conversion control apparatus 100 according to the exemplary embodiment of the present invention may be compensated in proportion to the sharp change of the input current or the load, thereby improving control performance of power conversion.

Especially, when the load current is sharply changed, the vehicle buck power conversion control apparatus 100 according to the exemplary embodiment of the present invention has improved control performance of power conversion compared to the vehicle buck power conversion control apparatus in the related art.

Figure 2:
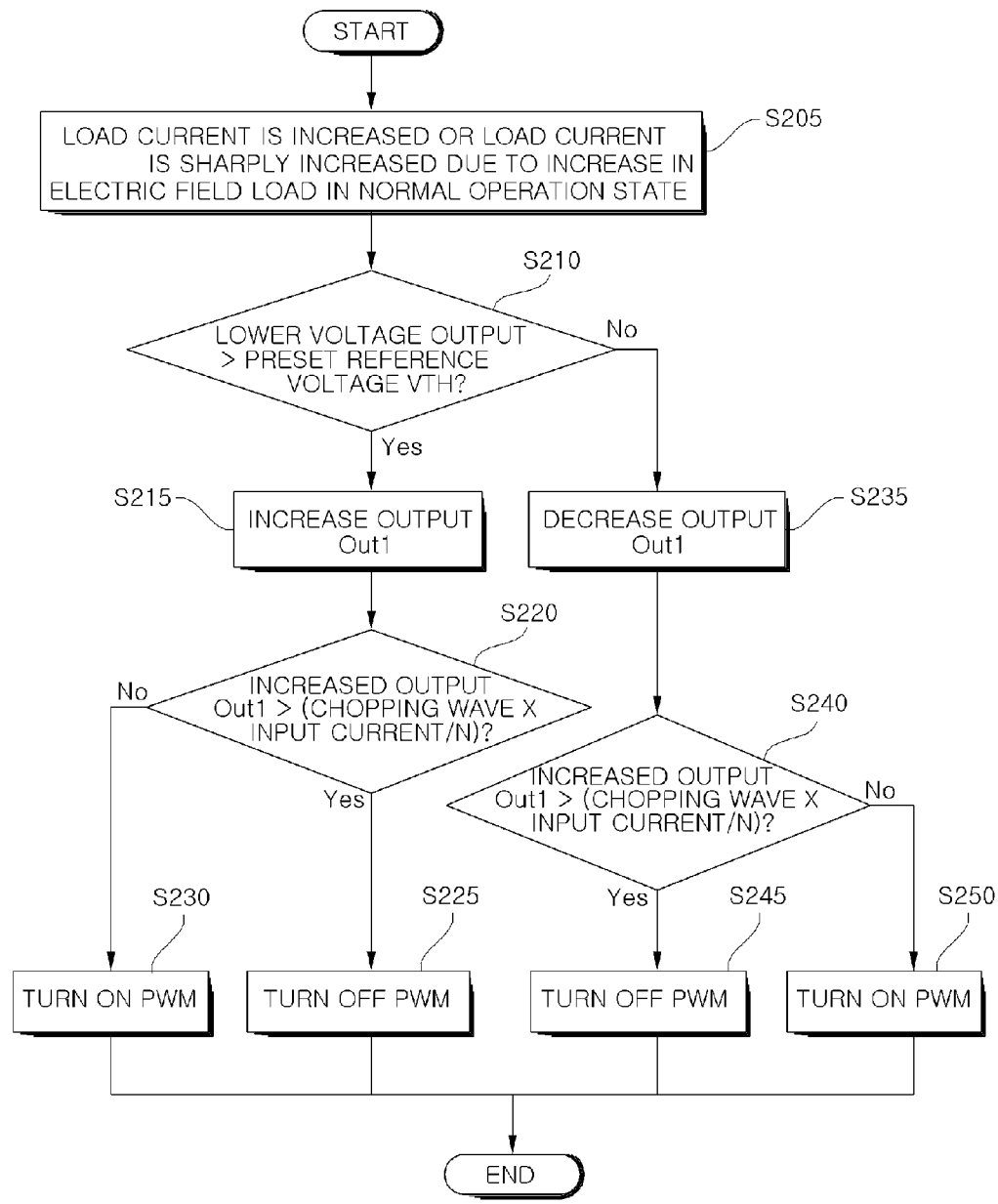
FIG. 2 is a flowchart related to a vehicle buck power conversion control method according to an exemplary embodiment of the present invention when load current is increased.

FIG. 2 is a flowchart related to a vehicle buck power conversion control method according to an exemplary embodiment of the present invention when load current is increased.

Referring to FIG. 2, when load current is increased or load current sharply increased due to an increase in an electric field load in a normal operation state of the power converter 110 (S205), the voltage comparator 120 compares low voltage output of the power converter 110 and a preset reference voltage Vth (S210).

When the low voltage output is equal to or larger than the reference voltage Vth, the output controller 130 increases output Out1 (S215).

The comparison controller 140 compares sizes of the increased output Out1 and (a chopping wave×input current/N) (S220). Since the load current is increased or the load current is sharply increased in (the chopping wave×input current/N), the input current is increased or sharply increased.

As a result of the size comparison, when the output Out1 is larger than (the chopping wave×input current/N), the comparison controller 140 turns off the PWM (S225), and when the output Out1 is smaller than (the chopping wave×input current/N), the comparison controller 140 turns on the PWM (S230)

When the low voltage output is smaller than the reference voltage Vth, the output controller 130 decreases output Out1 (S235).

The comparison controller 140 compares sizes of the decreased output Out1 and (the chopping wave×input current/N) (S240).

As a result of the size comparison, when the output Out1 is larger than (the chopping wave×input current/N), the comparison controller 140 turns off the PWM (S245), and when the output Out1 is smaller than (the chopping wave×input current/N), the comparison controller 140 turns on the PWM (S250).

Figure 3:
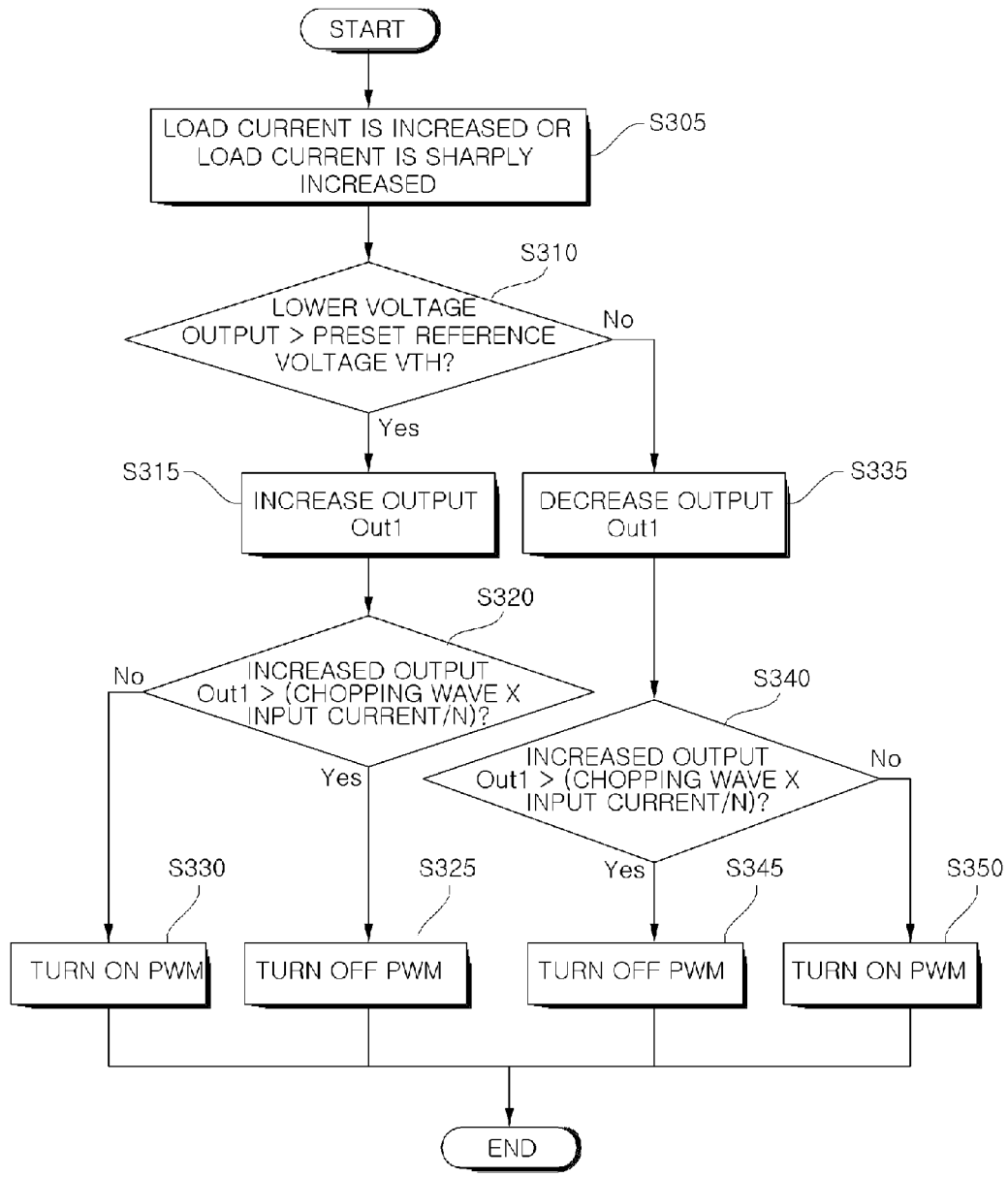
FIG. 3 is a flowchart related to a vehicle buck power conversion control method according to an exemplary embodiment of the present invention when load current is decreased.

FIG. 3 is a flowchart related to a vehicle buck power conversion control method according to an exemplary embodiment of the present invention when load current is decreased.

Referring to FIG. 3, when load current is decreased or load current is sharply decreased due to a decrease in an electric field load in a normal operation state of the power converter 110 (S305), the voltage comparator 120 compares the low voltage output of the power converter 110 and a preset reference voltage Vth (S310).

When the low voltage output is equal to or larger than the reference voltage Vth, the output controller 130 increases output Out1 (S315).

The comparison controller 140 compares sizes of the increased output Out1 and (a chopping wave×input current/N) (S320).

As a result of the size comparison, when the output Out1 is larger than (the chopping wave×input current/N), the comparison controller 140 turns off the PWM (S325), and when the output Out1 is smaller than (the chopping wave×input current/N), the comparison controller 140 turns on the PWM (S330).

When the low voltage output is smaller than the reference voltage Vth, the output controller 130 decreases output Out1 (S335).

The comparison controller 140 compares sizes of the decreased output Out1 and (the chopping wave×input current/N) (S340).

As a result of the size comparison, when the output Out1 is larger than (the chopping wave×input current/N), the comparison controller 140 turns off the PWM (S345), and when the output Out1 is smaller than (the chopping wave×input current/N), the comparison controller 140 turns on the PWM (S350).

Even when the load current is sharply decreased, the vehicle buck power conversion control apparatus 100 according to an exemplary embodiment of the present compares the output Out1 with the chopping wave considering the input current, differently from the vehicle buck power conversion control apparatus in the related art.

That is, since the load current is decreased or the load current is sharply decreased in (the chopping wave×input current/N), the input current is decreased or sharply decreased.

Accordingly, differently from the vehicle buck power conversion control apparatus in the related art, the condition of the PWM On and the comparison target for determining the time of the PWM On consider the change of the input current according to the decrease of the load current, so that the time of the PWM On may be increased compared to the vehicle buck power conversion control apparatus in the related art.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for controlling buck conversion of a vehicle when load current is increased or decreased, the apparatus comprising:
   a power converter configured to convert a high voltage of a high voltage battery to a low voltage, the power converter having an input current that varies according to the increase or the decrease in the load current;
   a voltage comparator configured to perform a first comparison comprising comparing a low voltage output value of the power converter to a preset reference voltage;
   an output controller configured to generate an output, and increase or decrease the generated output based on a comparison result of the first comparison; and
   a comparison controller configured to control an operation of a pulse width modulation (PWM) signal by
      performing a second comparison comprising comparing the generated output to a value obtained by multiplying a chopping wave by a value resulting from dividing the input current by a number N, the number N having a value that is greater than 1, and
      increasing or decreasing an On time of the PWM signal based on a comparison result of the second comparison.

2. The apparatus of claim 1, wherein the output controller is configured to increase the generated output when the low voltage output value is equal to or larger than the preset reference value according to the comparison result of the first comparison, and
   the output controller is configured to decrease the generated output when the low voltage output value is smaller than the preset reference value according to the comparison result of the first comparison.

3. The apparatus of claim 2, wherein when the output controller increases the output:
   the comparison controller is configured to decrease the On time of the PWM signal when the generated output is larger than the value obtained by multiplying the chopping wave by the value resulting from dividing the input current by the number N, and
   the comparison controller is configured to increase the On time of the PWM signal when the generated output is smaller than the value obtained by multiplying the chopping wave by the value resulting from dividing the input current by the number N.

4. The apparatus of claim 2, wherein when the output controller decreases the output:
   the comparison controller is configured to decrease the On time of the PWM signal when the generated output is larger than the value obtained by multiplying the chopping wave by the value resulting from dividing the input current by the number N, and
   the comparison controller is configured to increase the On time of the PWM signal when the generated output is smaller than the value obtained by multiplying the chopping wave by the value resulting from dividing the input current by the number N.

5. The apparatus of claim 1, wherein when the load current is increased, the input current is increased, and when the load current is decreased, the input current is decreased.

6. A method of controlling buck conversion of a vehicle when load current is increased or decreased, the method comprising:
   performing a power conversion operation by converting a high voltage of a high voltage battery to a low voltage, the power converter having an input current that varies according to the increase or the decrease in the bad current;
   performing a voltage comparison operation by comparing a low voltage output value of the power conversion operation to a preset reference voltage;
   performing an output control operation by generating an output, and increasing or decreasing the generated output based on a comparison result of the voltage comparison operation; and
   performing a comparison control operation to control an operation of a pulse width modulation (PWM) signal by:
      performing a PWM control comparison comprising comparing the generated output to a value obtained by multiplying a chopping wave by a value resulting from dividing the input current by a number N, the number N having a value that is greater than 1, and
      increasing or decreasing an On time of the PWM signal based on a comparison result of the PWM control comparison.

7. The method of claim 6, wherein performing the output control operation comprises:
   increasing the generated output when the low voltage output value is equal to or larger than the preset reference value according to the comparison result of the voltage comparison operation, and
   decreasing the generated output when the low voltage output value is smaller than the preset reference value according to the comparison result of the voltage comparison operation.

8. The method of claim 7, wherein when the output is increased in the output control operation, performing the comparison control operation comprises:
   decreasing the On time of the pulse width modulation signal when the generated output is larger than the value obtained by multiplying the chopping wave by the value resulting from dividing the input current by a number N; and
   increasing the On time of the pulse width modulation signal when the generated output is smaller than the value obtained by multiplying the chopping wave by the value resulting from dividing the input current by a number N.

9. The method of claim 7, wherein when the output is decreased in the output control operation, the comparison control operation comprises:
   comparing a value obtained by multiplying a value obtained by dividing the input current by N that is larger than 1 with the chopping wave with a size of the output;
   decreasing the On time of the pulse width modulation signal when the generated output is larger than the value obtained by multiplying the chopping wave by the value resulting from dividing the input current by a number N; and
   increasing the On time of the pulse width modulation signal when the output is smaller than the value obtained by multiplying the chopping wave by the value resulting from dividing the input current by a number N.

10. The method of claim 6, wherein when the load current is increased, the input current is increased, and when the load current is decreased, the input current is decreased.

* * * * *